Figure 1:
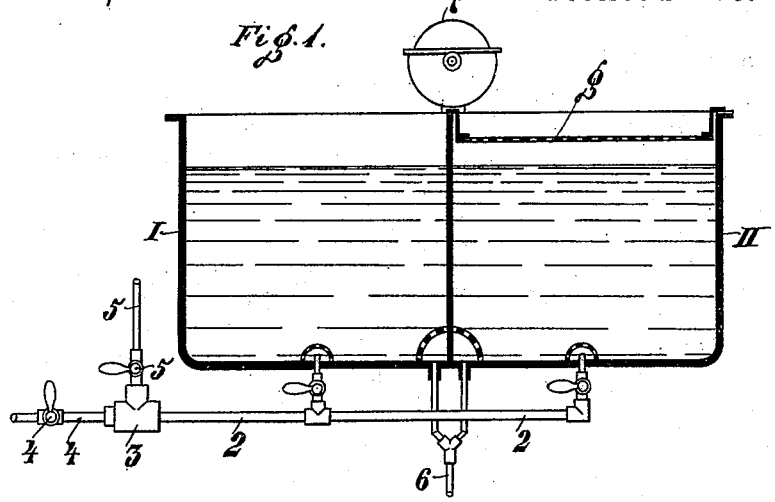

(No Model.)

H. TRILLICH.
COFFEE SUBSTITUTE AND METHOD OF PREPARING THE SAME.

No. 488,801. Patented Dec. 27, 1892.

Witnesses
A. J. Schwartz
E. B. Clark

Inventor
Heinrich Trillich
by Max Stengel
his Atty

UNITED STATES PATENT OFFICE.

HEINRICH TRILLICH, OF MUNICH, GERMANY.

COFFEE SUBSTITUTE AND METHOD OF PREPARING SAME.

SPECIFICATION forming part of Letters Patent No. 488,801, dated December 27, 1892.

Application filed September 9, 1891. Serial No. 405,216. (No specimens.)

*To all whom it may concern:*

Be it known that I, HEINRICH TRILLICH, a citizen of the Kingdom of Bavaria, and a resident of Munich, Bavaria, Germany, have invented certain new and useful Improvements in Coffee Substitutes and Methods of Preparing Same, of which the following is a specification.

It has been attempted in recent times to introduce brown-roasted malt as a substitute for coffee. The beverage thus prepared soon palls on the taste, however, either on account of its strong aromatic flavor or its burnt taste. The roasting process produces substances which, though possessing perhaps an aromatic coffee-odor, never impart the taste or flavor of coffee.

The present process is intended to produce a substance possessing in addition to the soluble nutritious substances of the malt, (whose saccharine substances in the present instance possess a perfect coffee-aroma and flavor) the aroma arising from the roasting of coffee; while the consumption of the beverage prepared therefrom is not attended by the unpleasant results of a continuous use of coffee.

The process is the following:—The malt is soaked in water of about 40° centigrade, until thoroughly moistened and is then roasted in drums until all moisture has evaporated and the grains have attained a glassy brown color. A spray of hot water is then thrown upon the hot malt without discontinuing the heating operation. This operation is for the purpose of freshly loosening the shell or husk of the malt and to adapt it for readily absorbing a liquid containing a coffee flavor. The liquid is obtained by the condensation of the vapors arising when coffee is roasted, or the essences contained therein. These products of condensation consist in a brownish solution, having an acidulous, bitter, harsh and coffee-like taste and aroma, while the poisonous principle of the coffee, the caffeine, is entirely absent. This caffeine-free solution of the aromatic principles of coffee, is prepared as an addition to the malt by first concentrating the same by distillation and neutralizing the distillate so obtained with bicarbonate of soda and saturating with sugar to a semi-liquid solution. Instead of the essences obtained in the roasting of coffee, a decoction of acorns or a solution of tannin may be employed and similarly treated with sugar. One of the above liquors is added to the moist, warm malt, (which is kept in rotation) by finely spraying the said liquor into the roasting apparatus, after the shell or husk has been loosened, as above stated. The malt is then further heated until the moisture has entirely evaporated and the shell of the malt is covered with a brown saccharine coating of the aromatic principles of coffee, whereupon the roasting-drum is removed from the fire and thus cooled somewhat. Cacao-fat (or any other suitable fat) is then added, which in melting and the further rotation of the malt is distributed over the individual grains and after cooling, covers the sugar-coating with a very thin film of fat, protecting the sugar-coating from moisture. The hot malt is finally rapidly cooled in special cooling apparatus and then freed from dust, dirt, detritus, &c.

Instead of adding the aromatic coffee-extract or the tannin solution to the malt, during the roasting-process, the process may be conducted in such a manner that a suitable quantity of aromatic coffee-extract or tannin-solution is added to the steeping-water during the soaking process described at the beginning of this specification, and the soaking operation is carried out with such solution. The malt is thereby so impregnated, that upon subsequent roasting and coating with a film of fat, the same product is obtained as by the process first described.

The product is very durable and possesses besides all the ingredients of roasted malt, the taste and smell of coffee, due to the coffee aroma contained therein.

The following apparatus may be employed for effectively carrying out the process:

Figure 1 represents in longitudinal section an arrangement by which the malt is treated during the soaking operation.

A soaking vat I, (or several vats in a continuous operation) is provided with a feed-pipe, 2, opening into the bottom and covered with a strainer or screen at its mouth. The feed-pipe is connected with the mixing apparatus, 3, of any desired construction into which opens the pipe, 4, for warm water and the pipe, 5, for the introduction of the solution of aromatic coffee-extract or tannin.

The latter is provided with a regulating-cock to suitably regulate the mixing operation.

6 represents a waste-pipe to draw off the used steeping-liquor from the soaking vat.

The malt to be converted into malt-coffee is introduced into the vat, I. The cocks, 4 and 5 are then opened to permit the warm water and the solution to enter the mixing-chamber to be there mixed and then to flow into the malt from below. After the lapse of about three hours, the same is sufficiently impregnated to be submitted to the roasting operation. To again employ the liquor, the soaked malt together with the same is lifted from vat I, poured into the strainer, $g$, suspended over the vat, II. The liquor flows into the vat, while malt is conveyed to the roasting-chamber by a conveyer. Additional warm and sufficiently concentrated liquor is then added to liquor in vat II, by pipe 2.

Figure 2:
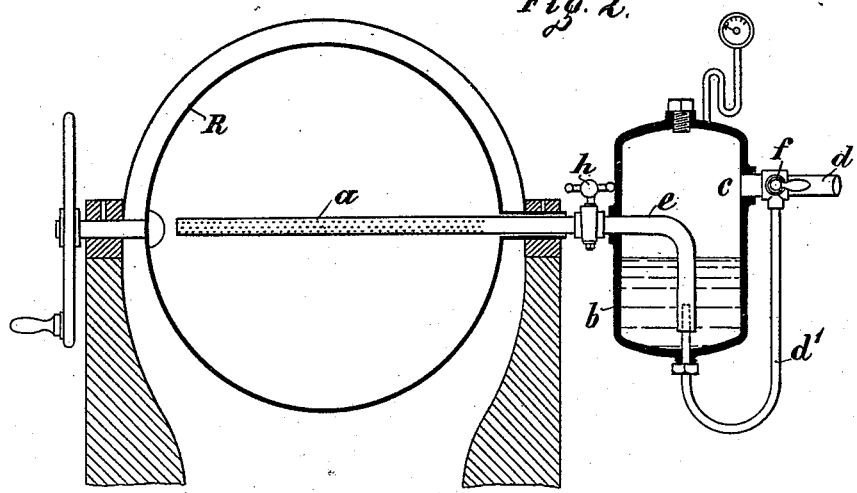

To adequately impregnate the malt with the mixture during the roasting process, the apparatus represented in section in Fig. 2, may be employed.

A tube, $a$, provided with fine perforations projects into the roasting drum, R, so that the liquor issuing therefrom in the form of a fine spray may be equally distributed over the roasting malt.

As shown in the drawings a strong-walled receptacle, $b$, serving for the reception of the liquor is arranged laterally of the drum R, a tube $e$, leading to the distributing-tube, $a$, from the bottom of the said receptacle. A tube, $d$, having a downward branch, $d'$, opens into the same at $c$. The lower mouth, which is sufficiently small, opens into tube, $e$. Shut-off cock are provided at $f$ and $h$. If the liquor aforesaid is to be distributed over the hot malt, the cock, $f$, is first opened while cock, $h$, as yet remains closed. As soon as the required steam-pressure (which may also be obtained by compressed air) is attained in the receptacle, $b$, the latter cock, $h$, is opened and consequently the liquor is forced into the roasting-drum. Steam may simultaneously be injected, if the cock, $f$, is so turned as to feed the tube, $d$. In this case, a mixture of the liquor and steam is sprayed over or into the malt. After this operation, the malt is further heated until the liquor has completely evaporated and the individual grains of malt are covered with a saccharine coating as above described in detail.

Figure 3:
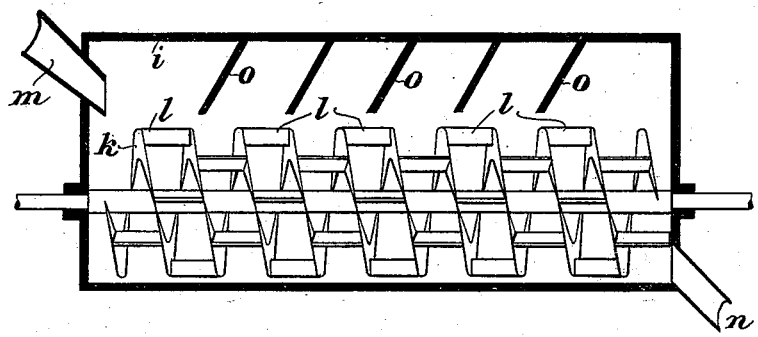

It is important that a rapid and uniform cooling of the malt ensues. To attain this object in an effective manner, the arrangement represented in longitudinal section in Fig. 3 is employed.

The closed casing, $i$, is provided with longitudinal scrapers, $l$, between the walls of the conveyer. The malt is thereby, both carried from the inlet, $m$, to the exit, $n$, and continually lifted, so as to drop in thin layers and to be continually mixed and effectively exposed to a cold stream of air blown against the same. The air is forced in at the side opposite to the malt inlet, or it may be exhausted by a ventilator. In order to bring the separate grains into intimate contact with the air-current, partitions are arranged in an effective manner, which direct the air downwardly against the malt. Care must be taken to rapidly carry off the vapors.

I claim—

1. The process which consists in soaking malt, then roasting the same, then spraying the same with a liquor containing the aromatic essences of coffee and sugar, and further heating the same until the shell or husk of the malt becomes covered with a saccharine coating and finally covering the grains with a film of fat and rapidly cooling the same, substantially as set forth.

2. A new article of food, which consists in grains of malt impregnated with the aromatic essences of coffee to the exclusion of the caffeine and covered with a saccharine coating, substantially as set forth.

In testimony that I claim the foregoing as my invention I have signed my name in presence of two subscribing witnesses.

HEINRICH TRILLICH.

Witnesses:
ALBERT WEICKMANN,
KARL MÄYER.